United States Patent [19]

Lawshea, Jr. et al.

[11] Patent Number: 5,655,310
[45] Date of Patent: Aug. 12, 1997

[54] MAGNETIC ALTERNATOR PULLEY MISALIGNMENT GAGE

[75] Inventors: Lonnie Lawshea, Jr., Pontiac; Florian C. Georgescu, Shelby Township, both of Mich.

[73] Assignee: Chrysler Corporation, Auburn Hills, Mich.

[21] Appl. No.: 439,166

[22] Filed: May 11, 1995

[51] Int. Cl.$^6$ .................................................. G01D 21/00
[52] U.S. Cl. .............................. 33/600; 33/645; 33/DIG. 1
[58] Field of Search ........................... 7/100, 164, 901; 29/271; 33/286, 288, 483, 533, 600, 605, 606, 607, 611, 645, DIG. 1

[56] References Cited

U.S. PATENT DOCUMENTS

| | | | |
|---|---|---|---|
| 1,888,454 | 11/1932 | Edson | 33/605 |
| 4,249,294 | 2/1981 | Belfiore | 29/271 |
| 4,964,224 | 10/1990 | Jackson | 33/645 |

FOREIGN PATENT DOCUMENTS

| | | | |
|---|---|---|---|
| 14371 | of 1896 | United Kingdom | 33/605 |

*Primary Examiner*—G. Bradley Bennett
*Attorney, Agent, or Firm*—Mark P. Calcaterra

[57] ABSTRACT

An alternator pulley misalignment gage that allows a worker to determine inboard and outboard alternator pulley misalignment during the manufacture of a vehicle engine. The misalignment gage includes a cylindrical member that is removably secured to an extending arm member so that the cylindrical member can be removed and other cylindrical members can be secured to the arm member for different engine configurations. A measuring device is attached to the arm member opposite to the cylindrical member. The cylindrical member is configured to be magnetically secured to a crankshaft pulley of the vehicle by a plurality of magnets. The measuring device includes a spring biased pointer that is slidably movable relative to the arm member in a direction substantially perpendicular to the plane of the arm member. Measuring indicia on the pointing member and the arm member give a determination of alternator pulley alignment relative to the crankshaft pulley when the cylindrical member is secured to the crankshaft pulley, and the pointing member is moved to contact the alternator pulley.

18 Claims, 3 Drawing Sheets

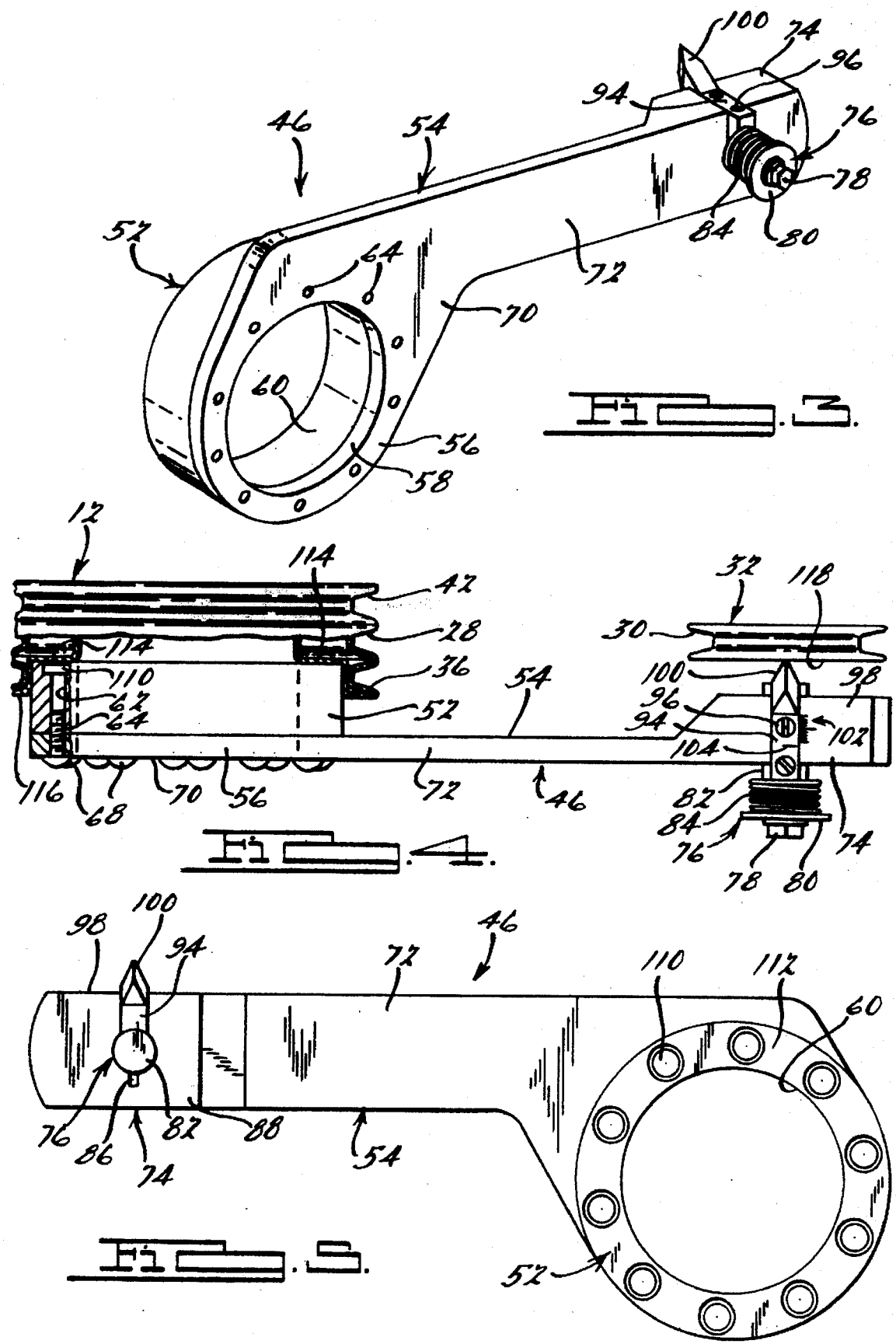

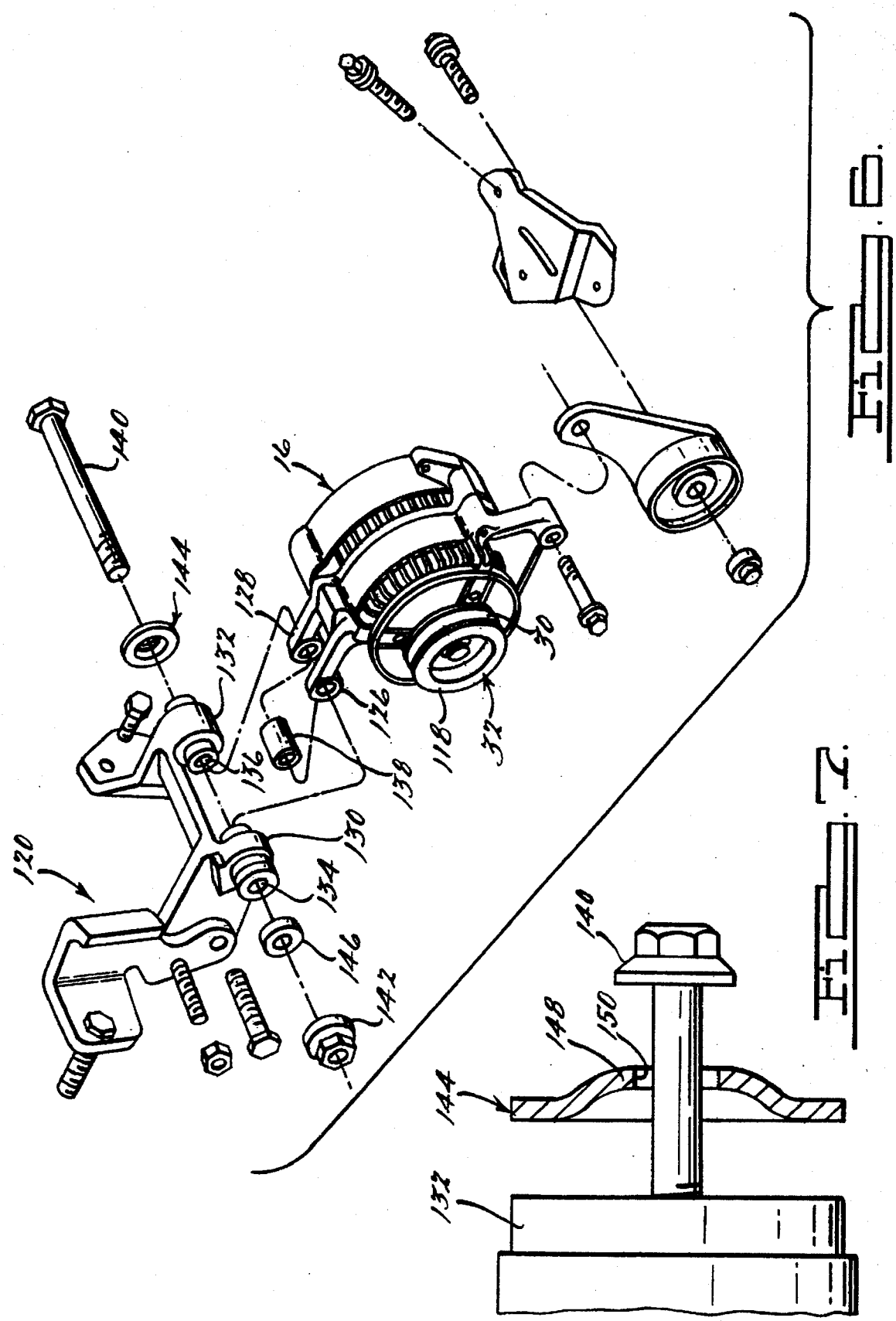

MAGNETIC ALTERNATOR PULLEY MISALIGNMENT GAGE

BACKGROUND OF THE INVENTION

1. Field of the Invention

This invention relates generally to a vehicle system pulley misalignment gage and, more particularly, to an alternator pulley misalignment gage that is magnetically secured to a crank shaft pulley of a vehicle, and includes a measuring device positioned relative to the alternator pulley so as to measure inboard and outboard alignment of the alternator pulley relative to the crank shaft pulley.

2. Discussion of the Related Art

As is well understood in the art, internal combustion engines used for driving vehicles include a crank shaft that imparts rotational movement to certain vehicle systems to provide the power necessary to operate the systems. The crank shaft is connected to a plurality of piston shafts having associated piston heads positioned within piston cylinders. A series of valves in communication with the piston cylinders allow fuel to be introduced into the cylinders to be combusted so as to drive the pistons in the cylinders, and allow exhaust to be removed from the cylinders after combustion. The crank shaft is rotated as a result of the reciprocal motion of the pistons within the cylinders from this process.

A crank shaft pulley is secured to a crank shaft flange at the front end of the crank shaft. The crank shaft pulley includes a series of parallel grooves that are appropriately configured to allow a series of drive belts to be rotatably secured to the crank shaft pulley. The drive belts are also rotatably secured to other pulleys associated with the engine, such as an alternator pulley, a power steering pulley, and an air conditioning (AC) compressor pulley that provides the driving force necessary to operate the alternator, power steering system and AC compressor. Therefore, rotation of the crank shaft causes energy to be transferred to these other vehicle systems.

A problem exists in the above-described configuration with respect to the alignment between the crank shaft pulley and the alternator pulley. Because the alternator is secured to the engine block by various types of brackets, the exact position of the alternator varies from vehicle to vehicle because of the acceptable flexibility in the machined tolerances of the brackets. In other words, different brackets may position the alternator at different locations relative to other engine components. Because the alternator pulley is secured to the alternator, alignment between the crank shaft pulley and the alternator pulley may also vary within the range of the acceptable tolerances. Consequently, the plane that the alternator pulley drive belt rotates in may be slightly skewed for some vehicles.

Misalignment between the alternator pulley and the crank shaft pulley has lead to a significant number of consumer complaints. If the alternator pulley is misaligned from the crank shaft pulley more than a certain amount, rotation of the alternator pulley drive belt may result in belt squeals and chirps, especially after a certain amount of wear has occurred on the drive belt. The belt squeals and chirps are a result of grooves and ribs in the drive belt that may bind in the alternator pulley at high revolutions. In order to correct this situation, the automobile manufacturer must either realign the alternator so that the alternator pulley is better aligned with the crank shaft pulley, or provide new belts to eliminate the squeals and chirps. If new belts are provided, the belt chirps may reappear after the new belts have been worn, thus requiring new belts again. As a result of this, the automobile manufacturer may incur significant cost after the vehicle has been sold due to correction of the belt chirps.

What is needed is an alternator pulley alignment tool that allows the automobile manufacturer to assess and correct alternator pulley misalignment at the manufacturing level of the vehicle to prevent correction costs later in the life of the vehicle. It is therefore an object of the present invention to provide such an alignment tool.

SUMMARY OF THE INVENTION

In accordance with the teaching of the present invention, an alternator pulley misalignment gage is disclosed that allows a worker to determine inboard and outboard alternator pulley misalignment during the manufacture of a vehicle engine. The misalignment gage includes a cylindrical member that is removably secured to an extending arm member by bolts or the like so that the cylindrical member can be removed and other cylindrical members can be secured to the arm member for different engine configurations. A measuring device is attached to the arm member opposite to the cylindrical member. The cylindrical member is configured to be magnetically secured to a crankshaft pulley of the vehicle by a plurality of magnets. The measuring device includes a spring biased pointing member that is slidably movable relative to the arm member in a direction substantially perpendicular to the plane of the arm member. Measuring indicia on the pointing member and the arm member give a determination of inboard and outboard alternator pulley alignment relative to the crankshaft pulley when the cylindrical member is secured to the crankshaft pulley, and the pointing member is moved to contact the alternator pulley.

Additional objects, advantages, and features of the present invention will become apparent from the following description and appended claims, taken in conjunction with the accompanying drawings.

BRIEF DESCRIPTION OF THE DRAWINGS

FIG. 3 is a perspective view of the misalignment gage of FIG. 2;

FIG. 4 is a top plan view of the misalignment gage of FIG. 2 shown relative to the crank shaft pulley and an alternator pulley;

FIG. 5 is a back plan view of the misalignment gage of FIG. 2;

FIG. 6 is a blown apart perspective view of the alternator shown in FIG. 1, and associated brackets for connecting the alternator to the engine; and FIG. 7 is a side cut-away plan view of a bolt and washer for securing the alternator to the brackets of FIG. 6.

DETAILED DESCRIPTION OF THE PREFERRED EMBODIMENTS

The following description of the preferred embodiments concerning an alternator pulley misalignment gage is merely exemplary in nature and is in no way intended to limit the invention or its applications or uses.

Figure 1:
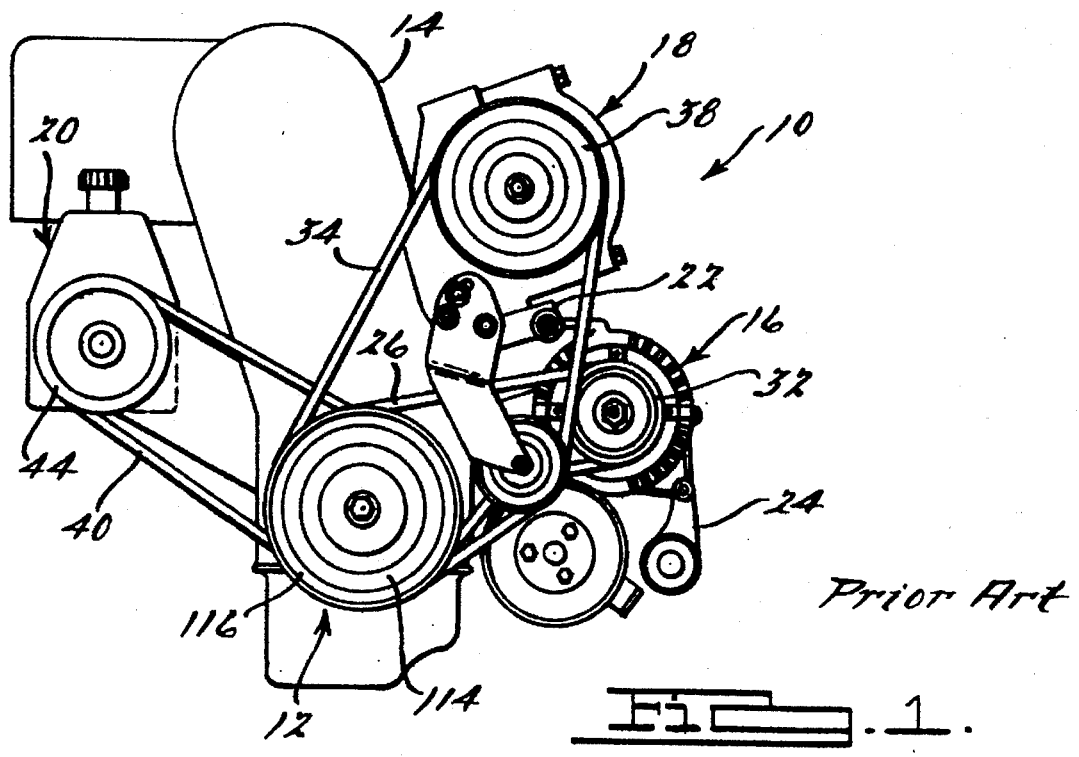
FIG. 1 is a front plan view of an internal combustion engine depicting specific engine components such as a crank shaft pulley, an alternator, an AC compressor, and a power steering pulley.

FIG. 1 shows a front view of an internal combustion engine 10 for a vehicle (not shown) including various engine components whose configuration and operation would be well understood to one of skill in the art. In one example, the engine 10 is a 2.2 or 2.5 liter internal combustion engine manufactured by Chrysler Corporation. However, it will be appreciated that the engine 10 could represent other internal combustion engines known in the art. For purposes of the present invention, a brief description of certain components of the engine 10 will be given with the understanding that the operation of the described components, as well as other engine components, is well known.

The engine 10 includes a crank shaft pulley 12 that is secured to a crank shaft flange (not shown) of a crank shaft (not shown) housed within an engine block 14. The crank shaft rotates upon operation of the engine 10 to impart drive to the vehicle in a manner that is well understood in the art. The combustion operation of the engine 10 that rotates the crankshaft is performed inside the engine block 14. Rotation of the crankshaft causes rotation of the crankshaft pulley 12. The engine 10 further includes an alternator 16 that provides electricity to the electrical components of the vehicle, an AC compressor 18 that provides cooling for the vehicle, and a power steering system 20 that provides power steering for the vehicle. A bracket 22 secures the alternator 16 to the engine block 14 and a bracket 24 secures the alternator 16 to another engine structure.

The crank shaft pulley 12 includes a plurality of parallel grooves (see FIG. 4) that accept a number of drive belts to impart rotational movement to the alternator 16, the compressor 18 and the power steering system 20. Particularly, an alternator drive belt 26 is rotatably mounted within a groove 28 of the crank shaft pulley 12 and is rotatably mounted in a groove 30 of an alternator pulley 32 connected to the alternator 16. Rotation of the crank shaft pulley 12 causes the drive belt 26 to rotate, which in turn causes the alternator pulley 32 to rotate and provide power to the alternator 16. An AC compressor drive belt 34 is rotatably mounted within a groove 36 of the crank shaft pulley 12, and is rotatably mounted in a groove (not shown) of a compressor pulley 38 connected to the compressor 18. Rotation of the crank shaft pulley 12 causes the drive belt 34 to rotate, which in turn causes the compressor pulley 38 to rotate and provide power to the AC compressor 18. A power steering drive belt 40 is rotatably mounted within a groove 42 of the pulley 12 and is rotatably mounted in a groove (not shown) of a power steering pulley 44 connected to the power steering system 20. Rotation of the crank shaft pulley 12 causes rotation of the drive belt 40, which in turn causes the power steering pulley 44 to rotate and provide power to the power steering system 20.

The brackets 22 and 24 secure the alternator 16 to the engine block 14 at a location where the alternator pulley 32 will be appropriately aligned with the crank shaft pulley 12 to accept the drive belt 26. However, due to variances in the acceptable tolerances of the brackets 22 and 24, the exact inboard/outboard (back/front) position of the alternator 16, and thus the alternator pulley 32, may vary from vehicle to vehicle within the tolerances of the brackets 22 and 24 such that the plane that the drive belt 26 rotates in may also vary. If the inboard/outboard position of the alternator 16 relative to the crank shaft pulley 12 is outside of a certain location, ribs and grooves associated with the drive belt 26 may bind slightly in the pulley 32, causing belt squeals and chirps noticeable to the operator of the vehicle. Therefore, it may be necessary to realign the alternator 16 relative to the crank shaft pulley 12 to eliminate the belt squeals and chirps.

Figure 2:
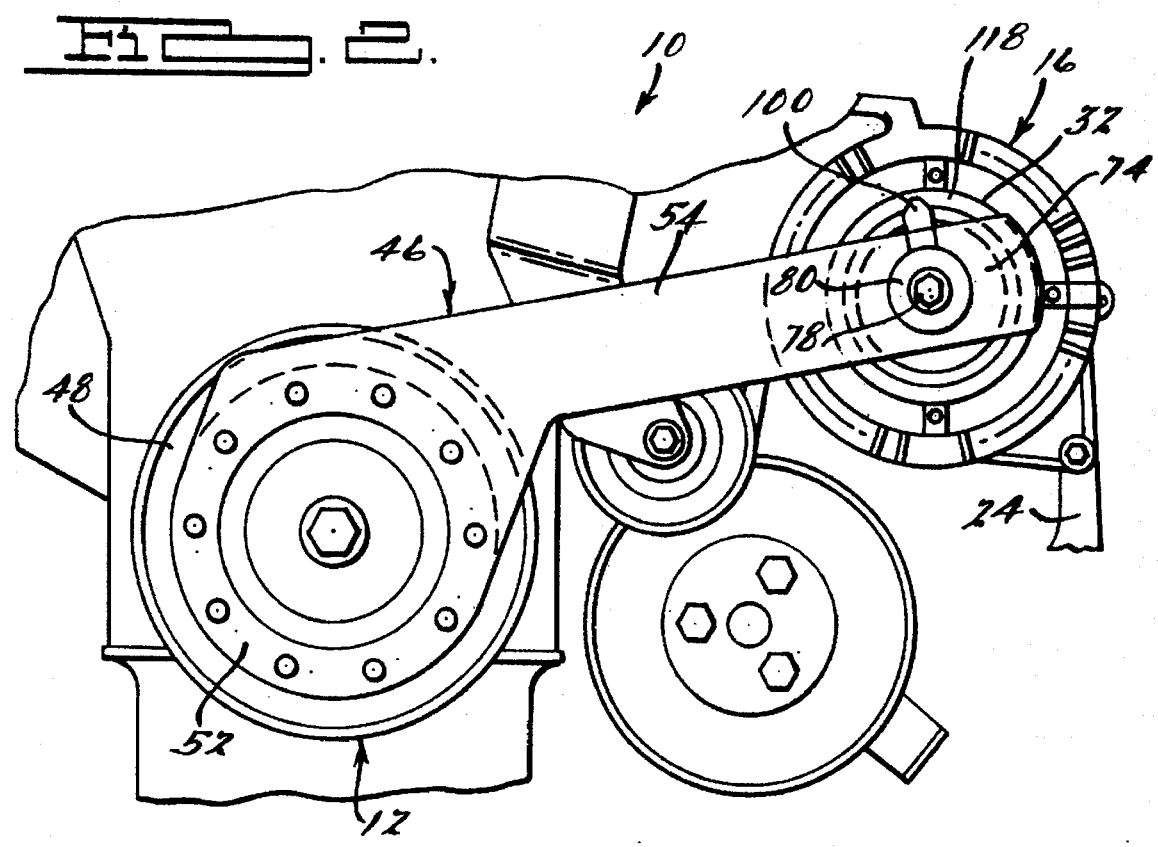
FIG. 2 is a front plan view of a portion of the engine of FIG. 1 showing the crank shaft pulley and alternator in combination with an alternator pulley misalignment gage according to an embodiment of the present invention.

FIG. 2 is a front plan view of a portion of the engine 10 showing the crank shaft pulley 12 and the alternator 16 without the drive belt 26. An alternator pulley misalignment gage 46, according to an embodiment of the present invention, is shown secured to a front face 48 of the crank shaft pulley 12. Other views of the misalignment gage 46 separated and in combination with the crank shaft pulley 12 and the alternator pulley 32 are shown in FIGS. 3–5. Particularly, FIG. 3 shows a perspective view of the misalignment gage 46, FIG. 4 shows a top, partially cut-away plan view of the misalignment gage 46 relative to the crank shaft pulley 12 and the alternator pulley 32, and FIG. 5 shows a back plan view of the misalignment gage 46.

The misalignment gage 46 includes a cylindrical member 52 secured to a base member 54. The base member 54 includes a ring portion 56 having an internal bore 58 that is aligned with an internal bore 60 of the cylindrical member 52. The ring portion 56 includes a plurality of holes strategically located around a peripheral area of the ring portion 56 that align with corresponding internal threaded bores 62 in the cylindrical member 52. A plurality of bolts 64 are threadably engaged into the threaded bores 62 to secure the cylindrical member 52 to the base member 54. The bolts 64 are threaded into the bores 62 until heads 68 of the bolts 64 lay flush against an outer surface 70 of the base member 54. In this manner, the cylindrical member 52 can be removed from the base member 54 such that different cylindrical members of different lengths can be secured to the base member 54 to accommodate different types of crank shaft pulleys for different engines. For example, for those engines that do not include AC compressors, the groove 36 of the crank shaft pulley 12 can be eliminated, thus affecting the length of the crank shaft pulley 12. Therefore, the length of the cylindrical member 52 must be adjusted accordingly.

The base member 54 includes an arm extension portion 72 that extends from the ring portion 56 at an appropriate angle for the purposes described herein. The base member 54 further includes a measuring portion 74 having a widened thickness at an end of the base member 54 opposite to the ring portion 56. When the gage 46 is secured to the crankshaft pulley 12, the measuring portion 74 is positioned relative to the alternator pulley 32 for measuring the position of the alternator pulley 32 relative to the crankshaft pulley 12 in a manner that will become apparent from the discussion below.

The measuring portion 74 includes a measuring device 76 that is slidably engageable through a suitably shaped opening extending through the measuring portion 74 that is substantially parallel to the axis of the cylindrical member 52. The measuring device 76 includes a bolt 78 and a washer 80 where the bolt 78 is threaded a certain distance into a cylindrical base portion 82 of the measuring device 76 as shown. A spring 84 is positioned between the washer 80 and the front surface 70 of the base member 54. The cylindrical base portion 80 extends through the opening in the measuring portion 74, and is prevented from being removed from the measuring portion 74 by the washer 80 and the spring 84 at the front surface 70, and a pin 86 secured to the base portion 82 adjacent a back surface 88 of the measuring portion 74.

A pointing portion 94 is secured to the base portion 82 by screws 96, and is visible through a top surface 98 of the measuring portion 74. The pointing portion 94 includes a pointer 100 that extends at an angle relative to the top surface 98 from the measuring portion 74 adjacent to the back surface 88. The top surface 98 includes a series of measuring indicia 102 positioned relative to the pointing portion 94, and the pointing portion 94 includes measuring indicia 104 on a top surface of the pointing portion 94 relative to the indicia 102. The measuring indicia 102 are a series of hash lines that are a predetermined distance apart. In one example, the distance between each hash line is 1 mm. The measuring indicia 104 is a single line that lines up with the lines of the measuring indicia 102 to determine the alignment of the alternator pulley 32.

The gage 46 includes a plurality of circumferentially arranged disk magnets 110 that are secured within the bores 62 of the cylindrical member 52 opposite to the bolts 64 so that the magnets 110 are substantially flush with a back surface 112 of the cylindrical member 52. In one embodiment, the magnets 110 are glued to a shoulder that is defined by an enlarged area at an outer end of the bores 62. It will be appreciated by those skilled in the art, that every bore 62 need not include a disc magnet 110. For purposes of the invention, the number and strength of the magnets 110 are selected so that the gage 46 can be magnetically secured to the crank shaft pulley 12 as will be discussed below, with as much as force necessary to hold the gage 46 in place, and be easily removed by a worker.

The circumference and diameter of the cylindrical member 52 is selected to allow the cylindrical member 52 to be secured to a shoulder 114 adjacent to an extending lip 116 of the crank shaft pulley 12. When the gage 46 is secured to the crank shaft pulley 12, the arm portion 72 positions the pointer 100 of the pointing portion 94 relative to a top area of a ridge 118 of the alternating pulley 32. The length of the cylindrical member 52, the thickness of the base member 54, and the extension of the pointer 100 when the spring 84 is in a relaxed state are calibrated such that the pointer 100 does not touch the ridge 118 in this position. By applying force on the bolt 78 that will cause the base portion 82 to slide within the measuring portion 74, the pointer 100 will contact the ridge 118. The measuring indicia 104 on the measuring device 76 will align with the measuring indicia 102 on the measuring portion 74. In this manner, the alignment between the alternator pulley 32 relative to the crank shaft pulley 12 can be determined.

If the measuring device 76 must slide beyond a predetermined distance determined by the relative position of the measuring indicia 102 and 104 to contact the pulley 32, the alternator position is considered to be too far inboard. If the measuring device 76 does not slide a predetermined distance determined by the relative position of the measuring indicia 102 and 104 before the pointer 100 contacts the pulley 32, then the alternator position is considered to be too far outboard. Both of these circumstances are considered unacceptable for alternator pulley positioning. In one embodiment, if the position of the alternator 16 is inboard or outboard more than 2 mm from a predetermined calibrated ideal position, then alternator position corrections need to be taken. Measurement of the position of the alternator pulley 32 is taken at a top area of the ridge 118 in one example. However, the measurement of the position of the alternator pulley 32 can be taken at other locations on the ridge 118, as well as multiple locations on the ridge 118, and still be within the scope of the invention.

FIG. 6 shows a blown apart perspective view of how the alternator 16 is secured to a bracket 120. The bracket 120 is different than the bracket 22 of FIG. 1 because the bracket 120 is intended to be used for engines that do not include AC compressors. However, the general manner in which the alternator 16 is secured to either of the brackets 22 or 120 is substantially similar. The alternator 16 includes two spaced apart axially aligned eyelets 126 and 128 that are positioned between extended portions 130 and 132 of the bracket 120. The extended portions 130 and 132 include axially aligned openings 134 and 136, respectively, that axially align with the eyelets 126 and 128 when the alternator 16 is secured to the bracket 120. A spacer member 138 is positioned between the eyelets 126 and 128 to provide stability to the alternator 16 when it is secured to the bracket 120. A bolt 140 extends through the axially aligned openings of the eyelets 126 and 128 and the openings 134 and 136 of the extended portions 130 and 132, and is secured there by a nut 142 to secure the alternator 16 to the bracket 120.

A specially configured washer 144 is provided if necessary to move the position of the alternator 16 outboard if the measurement taken by the gage 46 requires such adjustment. Depending on how much the position of the alternator 16 is outboard, determines the thickness or number of washers 144 to alter the position of the alternator 16. An enlarged portion of this area of the bracket 120 is shown in FIG. 7. Likewise, a washer 146 is provided to move the alternator 16 inboard if the gage 46 determines that the alternator 16 is too far outboard. As is apparent, the washer 144 includes a ridge portion 148 around an opening 150 through which the bolt 140 extends. The ridge portion 148 accommodates a pneumatic socket for securing the bolt 140 to the nut 142. FIG. 6 depicts various other bolts and brackets that are required for attaching the alternator 16 and the bracket 120 to the engine block 14 as is well understood in the art.

The gage 46 provides a mechanism for determining if the alternator 16 is located relative to the crankshaft pulley 12 at a position that will prevent squeals and chirps of the drive belt 26. The use of the gage 46 is intended to determine this alignment prior to the engine 10 being secured within the vehicle during manufacture of the engine 10 such as during an engine dress line. As will be appreciated by those skilled in the art, the gage 46 can be modified to measure the alternator alignment in any type of vehicle having an alternator pulley driven by a drive belt from a crankshaft pulley. Further, modifications to the gage 46 can be made to measure the position of other vehicle components relative to the crankshaft pulley 12, for example, the AC compressor pulley 38 and the power steering pulley 44.

In one specific embodiment, the cylindrical member 52, the arm member 54 and the measuring device 76 are all made of die cast aluminum components. However, as will be appreciated by those skilled in the art, other materials may be suitable. The number of magnets 110 selected is based on the magnetic power necessary to rigidly secure the gage 46 to the crankshaft pulley 12 so that a worker has both hands free to operate the measuring device 76, and still be able to readily remove the gage 46 from the crankshaft pulley 12 under a minimum amount of force. The cylindrical member 52 has a diameter of approximately 140 mm and the bores 62 are at 30° intervals around the circumference of the cylindrical member 52. For the 2.2 and 2.5 liter engines referenced above, the distance from a central axis of the ring of the cylindrical member 52 and the pointer 100 is 269 mm.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A misalignment gage for determining the alignment between a system pulley of a vehicle engine and a crankshaft pulley of the engine, said gage comprising:

a base portion configured to be removably secured to the crankshaft pulley;

an arm extension portion extending from the base portion; and a measuring portion positioned on the arm portion, said measuring portion including a measuring device that is configured to be positioned relative to the system pulley when the base portion is secured to the crankshaft pulley, said measuring device providing an indication of the position of the system pulley relative to the crankshaft pulley.

2. The gage according to claim 1 wherein the base portion includes at least one magnet that is positioned to magnetically secure the gage to the crankshaft pulley.

3. The gage according to claim 2 wherein the at least one magnet is a plurality of magnets positioned symmetrically around a circumference on the base portion.

4. The gage according to claim 1 wherein the base portion is a cylindrical member including an internal bore, said arm extension portion including a ring portion having an internal bore that aligns with the internal bore of the cylindrical member.

5. The gage according to claim 4, wherein the cylindrical member is removably secured to the ring portion by at least one fastening device.

6. The gage according to claim 1 wherein the measuring device includes a slidable member that is slidable within an opening in the measuring portion, said slidable member being slidable in a direction substantially perpendicular to a plane of the arm portion so as to contact the system pulley and give an indication of an inboard and outboard position of the system pulley relative to the crankshaft pulley.

7. The gage according to claim 6 wherein the slidable member and the measuring portion each include measuring indicia positioned relative to each other so as to provide a measurement of the position of the slidable member when it is in contact with the system pulley.

8. The gage according to claim 6 wherein the slidable member is spring biased when the slidable member contacts the system pulley.

9. The gage according to claim 6 wherein the slidable member includes a pointer portion that extends from the slidable member to contact the system pulley.

10. A misalignment gage for determining the alignment between a system pulley of a vehicle engine and a crankshaft pulley of the engine, said gage comprising:

a cylindrical member including a front end face and a back end face, said cylindrical member including a plurality of magnets positioned around the cylindrical member such that a magnetic face of each magnet is substantially flush with the back end face of the cylindrical member;

an arm member including a ring portion at one end and a measuring portion at an opposite end, said ring portion being removably secured to the front end face of the cylindrical member; and a measuring device slidably connected to the measuring portion of the arm member, said measuring device including a pointer portion, wherein the cylindrical member is configured to be magnetically secured to the crankshaft pulley and the measuring device is configured to be positioned relative to the system pulley, said measuring device being slidable such that the pointer portion contacts the system pulley to give an indication of an inboard and outboard position of the system pulley relative to the crankshaft pulley.

11. The gage according to claim 10 wherein the ring portion is secured to the cylindrical member by a plurality of bolts such that an internal bore of the cylindrical member aligns with an internal bore of the ring portion.

12. The gage according to claim 10 wherein the measuring device and the measuring portion include measuring indicia positioned relative to each other so as to provide a measurement of the position of the measuring device when the pointer portion contacts the system pulley.

13. The gage according to claim 10 wherein the measuring device is spring biased when the pointer portion contacts the system pulley to return the measuring device to a non-measuring position.

14. A method of determining the alignment between a system pulley of a vehicle engine and a crankshaft pulley of the vehicle engine, said method comprising the steps of:

providing an alignment gage, said alignment gage including a measuring device;

removably securing the alignment gage to the crankshaft pulley such that the measuring device is positioned relative to the system pulley; and moving the measuring device to contact the system pulley so as to provide an indication of the position of the system pulley relative to the crank shaft pulley.

15. The method according to claim 14 wherein the step of removably securing the alignment gage to the crankshaft pulley includes magnetically securing the alignment gage to the crankshaft pulley.

16. The method according to claim 14 wherein the step of providing an alignment gage includes the steps of providing an alignment gage having a cylindrical member configured to be secured to the crankshaft pulley, providing an arm extension member extending from the cylindrical member, and slidably securing the measuring device within a measuring portion of the arm member.

17. The method according to claim 14 wherein the step of positioning the measuring device relative to the system pulley includes positioning the measuring device relative to an alternator pulley to determine an inboard and outboard position of the pulley relative to the crank shaft pulley.

18. A misalignment gage for determining the alignment between an alternator pulley associated with an alternator of a vehicle engine and a crankshaft pulley of the engine, said gage comprising:

a base portion configured to be removably secured to the crankshaft pulley;

an arm extension portion extending from the base portion; and a measuring portion positioned on the arm portion, said measuring portion including a measuring device that is configured to be positioned relative to the alternator pulley when the base portion is secured to the crankshaft pulley, said measuring device providing an indication of the position of the alternator pulley relative to the crankshaft pulley.

* * * * *